(12) United States Patent
Ryoo et al.

(10) Patent No.: US 9,246,389 B2
(45) Date of Patent: Jan. 26, 2016

(54) HIGH PRECISION DC TO DC CONVERTER WITH WIDE LOAD RANGE AND GATE DRIVE CIRCUIT FOR USE THEREIN

(71) Applicant: KOREA ELECTROTECHNOLOGY RESEARCH INSTITUTE, Changwon-si, Gyeongsangnam-do (KR)

(72) Inventors: Hong Je Ryoo, Changwon-si (KR); Sung Roc Jang, Changwon-si (KR); Suk Ho An, Changwon-si (KR); Ji Woong Gong, Changwon-si (KR)

(73) Assignee: KOREA ELECTRO TECHNOLOGY RESEARCH INSTITUTE, Changwon-Si, Gyeongsangnam-Do (KR)

( * ) Notice: Subject to any disclaimer, the term of this patent is extended or adjusted under 35 U.S.C. 154(b) by 269 days.

(21) Appl. No.: 14/016,773

(22) Filed: Sep. 3, 2013

(65) Prior Publication Data
US 2014/0368175 A1 Dec. 18, 2014

(30) Foreign Application Priority Data

Jun. 14, 2013 (KR) .......................... 10-2013-0068148

(51) Int. Cl.
*H02M 3/158* (2006.01)
*H02M 3/28* (2006.01)
*H02M 3/335* (2006.01)

(52) U.S. Cl.
CPC ............ *H02M 3/1584* (2013.01); *H02M 3/285* (2013.01); *H02M 3/33523* (2013.01); *H02M 2003/1586* (2013.01); *Y02B 70/1433* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,405,955 | B2* | 7/2008 | Nakahori | H02M 3/33569 323/333 |
| 2009/0196082 | A1* | 8/2009 | Mazumder | H02M 5/458 363/132 |
| 2010/0182814 | A1* | 7/2010 | Tada | H02J 7/0054 363/134 |
| 2011/0254528 | A1 | 10/2011 | Danesh-Pajooh-Nejad et al. | |
| 2012/0320638 | A1* | 12/2012 | Boysen | H02M 3/3376 363/21.02 |

FOREIGN PATENT DOCUMENTS

DE 4337504 A1 5/1995

OTHER PUBLICATIONS

H.Figge et al., "Paralleling of LLC Resonant Converters using Frequency Controlled Current Balancing", Power Electronics Specialists Conference, 2008, 1080-1085 pages.
European Search Report for application No. 13182746.1 dated Dec. 8, 2014.

* cited by examiner

*Primary Examiner* — Emily P Pham
(74) *Attorney, Agent, or Firm* — Hauptman Ham, LLP

(57) ABSTRACT

A high precision DC/DC resonant converter with a wide load range includes a first switch leg having one end connected to an anode terminal of a DC power source and the other connected to a cathode terminal of the DC power source to independently operate at a switching frequency used in an application of an output voltage for no load or a light load equal to or less than a rated load; and one or more second switch legs having one end connected to the anode terminal of the DC power source and the other end connected to the cathode terminal of the DC power source to operate at a switching frequency for the rated load or a frequency equal to or less than the switching frequency used in the application of the output voltage for no load or the light load that the first switch leg takes charge of.

13 Claims, 9 Drawing Sheets

HIGH PRECISION DC TO DC CONVERTER WITH WIDE LOAD RANGE AND GATE DRIVE CIRCUIT FOR USE THEREIN

CROSS-REFERENCE TO RELATED APPLICATION

This application claims under 35 U.S.C. §119(a) the benefit of Korean Patent Application No. 10-2013-0068148 filed Jun. 14, 2013, the entire contents of which are incorporated herein by reference.

BACKGROUND (a) Technical Field

The present invention relates to a resonant converter. More particularly, the present invention relates to a resonant converter that enables high efficient precision control even at no load or light load in which low power is used.

(b) Background Art

Generally, DC/DC converters have been widely used in various industrial fields to convert an input DC voltage into an output DC voltage at a different level. The DC/DC converter converts a DC voltage into an AC voltage, and then the AC voltage is either raised or dropped by a transformer to be rectified again into a DC voltage, allowing the voltage to be transformed.

There are many circuit configurations for implementing the DC/DC converter, and one example thereof is a resonant converter. The resonant converter uses a resonant phenomenon of an inductor Lr and a capacitor Cr.

FIG. 11 is a view illustrating control characteristics of a resonant converter according to the switching frequency, which shows the resonant converter operating in a continuous conduction region has to increase the switching frequency to lower the output voltage. As an example, the switching frequency needs to further increase to lower a current from an output of 4 A to an output of 2 A.

However, when the switching frequency becomes higher, a switching loss of the resonant converter increases.

FIG. 12 is a view illustrating a loss of an Insulated Gate Bipolar Transistor (IGBT) when the output power (voltage and current) is lowered for the use at a light load region.

That is, in the DC/DC resonant converter operation in the continuous conduction region, the IGBT loss rapidly increases during the light load operation, and thus, the efficiency can be rapidly reduced or the switching element such as the IGBT can be damaged by burning.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a DC/DC converter that can be used in all load ranges (from no load to full load) from the no load condition to the rated load condition including the light load condition while maintaining the low conduction loss and switching loss of the resonant converter.

The present invention also provides a high precision DC/DC converter that can minimize a ripple component of an output voltage in a process of producing a desired output voltage through the DC power conversion.

The present invention also provides a high precision DC/DC converter that can protect a sensitive load from an arc to minimize the energy transmitted to the load because it is possible to control with high accuracy and to reduce ripples without increasing the value of filter capacitor.

The present invention provides a DC/DC converter, to which a switching frequency can be stably applied even in a power on/off process.

In one aspect, the present invention provides an isolated resonant converter for converting a direct current (DC) into another DC with a desired level, including: a first switch leg having one end connected to a positive terminal of a DC power source and the other end connected to a negative terminal of the DC power source to independently operate at a switching frequency used in an application of an output voltage for no load or a light load equal to or less than a rated load and operate so as to reduce a ripple of the output voltage at a frequency equal to or less than the switching frequency used in the application of the output voltage for no load or the light load equal to or less than the rated load; and one or more second switch legs having one end connected to the positive terminal of the DC power source and the other end connected to the negative terminal of the DC power source to operate at a switching frequency for the rated load or a frequency equal to or less than the switching frequency used in the application of the output voltage for no load or the light load that the first switch leg takes charge of.

In an exemplary embodiment, the first and second switch legs may include two switching units connected in series, and the switching unit may include: a power semiconductor switching element; a diode including a cathode connected to a current inflow terminal of the power semiconductor switching element and an anode connected to a current outflow terminal of the power semiconductor switching element; a snubber capacitor connected in parallel to the diode; and a gate drive circuit applying a switching signal to a terminal for turning-on/off control of the power semiconductor switching element.

In another exemplary embodiment, a value of a capacitor of a snubber circuit for preventing a rapid voltage increase of the first switch leg may be designed to be smaller than a value of a capacitor of a snubber circuit of the second switch leg such that zero voltage sensing of the gate drive circuit of the first switch leg is faster than zero voltage sensing of the gate drive circuit of the second switch leg.

In still another exemplary embodiment, the gate drive circuit may be configured to include a first power semiconductor switching element, a second power semiconductor switching element, first to third diodes, and first to eighth resistors, and a capacitor. In order to distinguish a charge path and a discharge path of a current applied to the terminal for the turning-on/off control of the power semiconductor switching element of the switching unit, a gate drive signal may be inputted into the current outflow terminal of the first power semiconductor switching element, and one end of the sixth resistor may be connected to the current outflow terminal of the first power semiconductor switching element. The current outflow terminal of the first power semiconductor switching element may be connected to one end of the capacitor, one end of the fourth resistor, one end of the second resistor, and the current outflow terminal of the power semiconductor switch element of the switching unit. The other end of the capacitor may be connected to one end of the first resistor, one end of the fifth resistor, a cathode of the first diode, and a terminal for turning-on/off control of the first power semiconductor switching element. The other end of the first resistor may be connected to one end of the second resistor. An anode of the first diode may be connected to one end of the third resistor. The other end of the third resistor may be connected to the other end of the first resistor. The other end of the fifth resistor may be connected to an anode of the second diode, and a cathode of the second diode may be connected to the current inflow terminal of the power semiconductor switching element of the switching unit. The other end of the sixth resistor may be connected to an anode of the third diode. A cathode of the third diode may be connected to the terminal for the turning-on/off control of the power semiconductor switching element of the switching unit, one end of the seventh resistor, and a current outflow terminal of the second power semiconductor switching element. The other end of the seventh resistor may be connected to the other end of the fourth resistor and a terminal for turning-on/off control of the second power semiconductor switching element. Also, the current outflow terminal of the second power semiconductor switching element may be connected to one end of the eighth resistor, and the other end of the eighth resistor may be connected to the current outflow terminal of the second power semiconductor switching element.

In yet another exemplary embodiment, the power semiconductor switching element may be selected from on/off controllable switching elements such as an insulated gate bipolar transistor, a MOSFET, and a bipolar junction transistor.

In still yet another exemplary embodiment, a value of a first capacitor of the gate drive circuit and a value of the first resistor may be controlled to adjust a maximum dead time of the gate drive circuit.

In a further exemplary embodiment, a value of a first capacitor of the gate drive circuit of the first switch leg may be designed to be smaller than a value of a first capacitor of the gate drive circuit of the second switch leg, and a value of a first resistor of the gate drive circuit of the first switch leg may be designed to be smaller than a value of a first resistor of the gate drive circuit of the second switch leg, such that an operation frequency range of the power semiconductor switching element of the gate drive circuit of the first switch leg is wider than an operation frequency range of the power semiconductor switching element of the gate drive circuit of the second switch leg.

In an exemplary embodiment, the isolated resonant converter may further include a controller that applies a gate drive signal to the gate drive circuit.

In another exemplary embodiment, the controller may include: a switching frequency generating unit generating a switching frequency necessary for an operation of the first and second switch legs; and an operation determining unit stably controlling turning-on/off of the switching frequency generating unit.

In still another exemplary embodiment, the switching frequency generating unit may be configured to include a voltage controller, a current controller, a switching frequency modulator, a diode unit determining a voltage applied to the switching frequency modulator, a switching frequency phase shifter, and an AND gate. The voltage controller may compare a sensed output DC voltage value with a targeted reference voltage value, and when the sensed value is smaller than the reference voltage value, may output a voltage proportional to a different between the sensed value and the reference voltage value. The current controller may compare a sensed output DC current value with a targeted reference current value, and when the sensed value is smaller than the reference current value, may output a voltage proportional to a different between the sensed value and the reference current value. The diode unit may compare output voltage values from the voltage controller and the current controller, and may apply smaller one of the output voltages to the switching frequency modulator. The switching frequency modulator may output a switching frequency in proportion to a magnitude of a signal applied from the voltage controller or the current controller through the diode unit. The switching frequency phase shifter may receive the switching frequency from the switching frequency modulator to generate a frequency phase-shifted from the switching frequency according to the number of the first and second switch legs. Also, the AND gate may be provided in plurality according to the number of the first and second switch legs and may receive the frequency from the switching frequency phase shifter through one terminal by each AND gate to take charge of each switch leg.

In yet another exemplary embodiment, the operation determining unit may include an SR latch, a comparator, and an OR gate. The comparator may compare a value sensed from an output terminal with a predetermined reference value, and when the sensed value is greater than the predetermined reference value, may output a high output signal. The OR gate may receive a protection circuit-related signal including a value outputted from the comparator and outputs the protection circuit-related signal to an R terminal of the SR latch for turning off control of a power supply. Also, the SR latch may receive a power application signal from an S terminal to perform the turning-on/off of the power supply. A voltage of a Q terminal may be determined by the signals of the S terminal and the R terminal, and thus the SR latch may perform the turning-on/off of the power supply using the voltage of the Q terminal.

Other aspects and exemplary embodiments of the invention are discussed infra.

In another aspect, the present invention provides a gate drive circuit is configured to include a first power semiconductor switching element, a second power semiconductor switching element, first to third diodes, and first to eighth resistors, and a capacitor; to distinguish a charge path and a discharge path of a current applied to the terminal for the turning-on/off control of the power semiconductor switching element of the switching unit, a gate drive signal is inputted into the current outflow terminal of the first power semiconductor switching element, and one end of the sixth resistor is connected to the current outflow terminal of the first power semiconductor switching element; the current outflow terminal of the first power semiconductor switching element is connected to one end of the capacitor, one end of the fourth resistor, one end of the second resistor, and the current outflow terminal of the power semiconductor switch element of the switching unit; the other end of the capacitor is connected to one end of the first resistor, one end of the fifth resistor, a cathode of the first diode, and a terminal for turning-on/off control of the first power semiconductor switching element; the other end of the first resistor is connected to one end of the second resistor; an anode of the first diode is connected to one end of the third resistor; the other end of the third resistor is connected to the other end of the first resistor; the other end of the fifth resistor is connected to an anode of the second diode, and a cathode of the second diode is connected to the current inflow terminal of the power semiconductor switching element of the switching unit; the other end of the sixth resistor is connected to an anode of the third diode; a cathode of the third diode is connected to the terminal for the turning-on/off control of the power semiconductor switching element of the switching unit, one end of the seventh resistor, and a current outflow terminal of the second power semiconductor switching element; the other end of the seventh resistor is connected to the other end of the fourth resistor and a terminal for turning-on/off control of the second power semiconductor switching element; and the current outflow terminal of the second power semiconductor switching element is connected to one end of the eighth resistor, and the other end of the eighth resistor is connected to the current outflow terminal of the second power semiconductor switching element.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
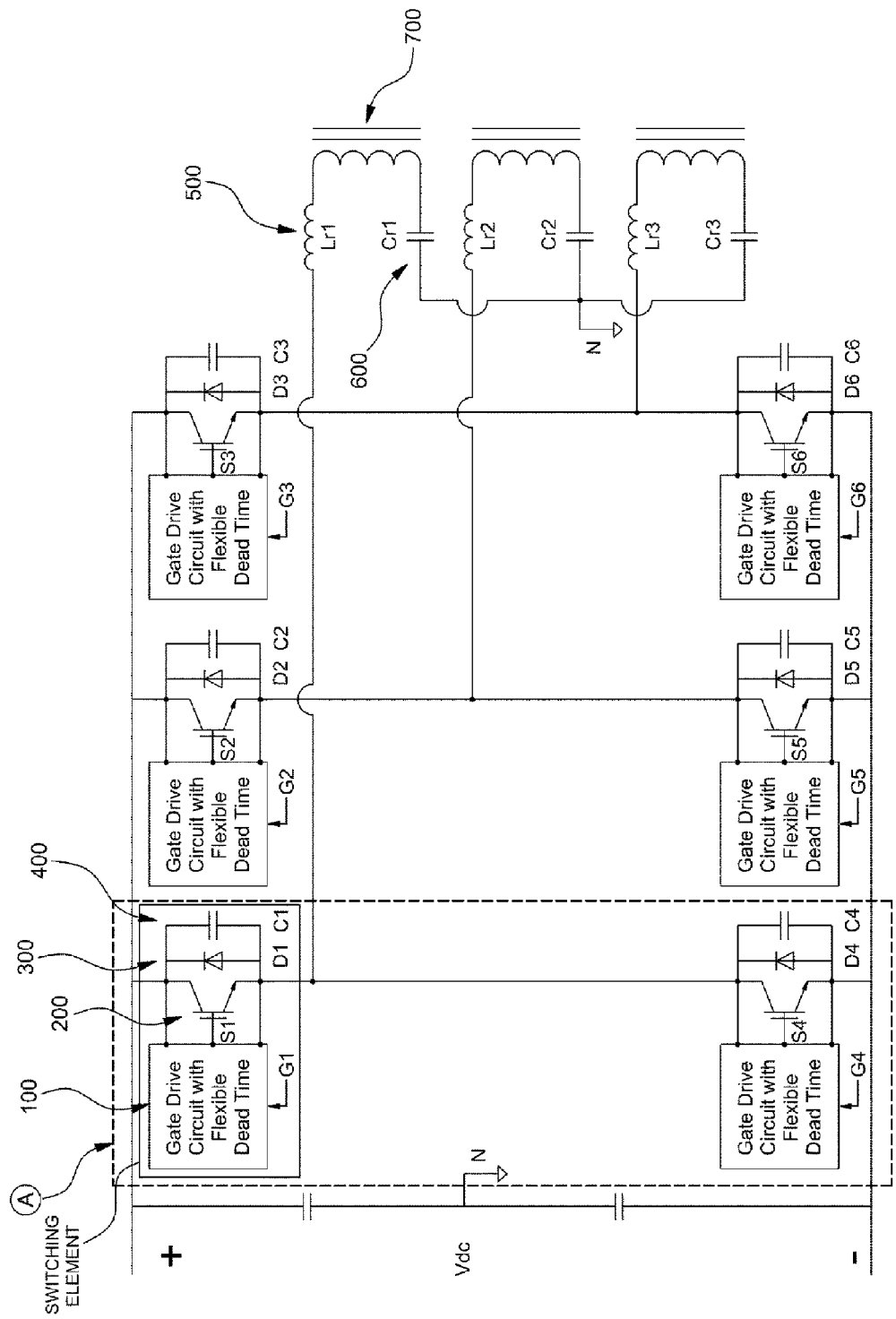
FIG. 1 is a view illustrating an internal configuration of a resonant converter according to an exemplary embodiment of the present invention.

Reference numerals set forth in the Drawings includes reference to the following elements as further discussed below:

100: gate drive circuit
111: first capacitor
121: first resistor
122: fifth resistor
123: sixth resistor
124: fourth resistor
125: eighth resistor
126: third resistor
131: first MOSFET
132: second MOSFET
141: first diode
142: second diode
143: third diode
200: insulated gate bipolar transistor (IGBT)
300: diode
400: capacitor
500: resonant inductor
600: resonant capacitor
700: transformer
800: controller
810: switching frequency generating unit
811: voltage controller
812: current controller
813: diode unit
814: switching frequency modulator
815: switching frequency phase shifter
816: AND gate
820: operation determining unit
821: comparator
822: OR gate
823: SR latch It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The above and other features of the invention are discussed infra.

Hereinafter, exemplary embodiments of the present invention will be described in detail with reference to the accompanying drawings so that those skilled in the art can easily carry out the present invention.

FIG. 1 is a view illustrating an internal configuration of a resonant converter according to an exemplary embodiment of the present invention.

a resonant converter according to an exemplary embodiment of the present invention may include a gate drive circuit 100, an Insulated Gate Bipolar Transistor (IGBT) 200, a diode 300, a capacitor 400, a resonant inductor (Lr) 500, a resonant capacitor (Cr) 600, and a transformer 700.

In the resonant converter according to the exemplary embodiment of FIG. 1, two switch elements are connected in series to form three branches. These three branches may be called switch legs. The switch leg may be a circuit in which a pair of switching units including the gate drive circuit 100, the Insulated Gate Bipolar Transistor (IGBT) 200, the diode 300, and the capacitor 400 are connected in series.

The switch element used in the switching unit of the resonant converter according to the exemplary embodiment of the present invention may include the IGBT 200. The IGBT 200 may be a part that can convert a DC voltage into an AC voltage through frequency switching.

Accordingly, three switch legs of the resonant converter may be a 3-phase half bridge resonant inverter in which three single-phase half bridge inverters are combined.

However, the present invention is not necessarily limited to the IGBT 200, and a power semiconductor switching element such as a Metal-Oxide-Semiconductor Field-Effect Transistor (MOSFET) or a bipolar junction transistor that is possible to control turning-on/off can be used.

In case of the power semiconductor switching element, since the flow of electrons is opposite to the direction of a current, a collector or a drain may be referred to as a current inflow terminal, and a source or an emitter may be referred to as a current outflow terminal. Also, a gate or a base may be referred to as a terminal for on/off switching control.

The resonant inductor 500, the resonant capacitor 600, and the primary side of the transformer 700 may be connected in series to a connection part of the IGBTs 200. The resonant inductor 500 and the resonant capacitor 600 may determine a resonant frequency with a resonant tank parameter of each switch leg, and may allow the IGBT 200 to perform soft switching. The transformer 700 may vary a voltage and a current to control an output power (voltage and current).

G1 to G6 applied to the gate driver circuits 100, which is a frequency variable signal for controlling the output voltage into a desired value, may be used as an input of the gate drive circuit in the resonant converter according to the exemplary embodiment of the present invention.

The gate driver circuit 100 may sense the voltages on the both terminals of the IGBT 200. When the voltage of the capacitor 400 of the snubber circuit connected in parallel to the IGBT 200 is not zero, the gate driver circuit 100 may operate in dead time mode, allowing the semiconductor device not to be turned on even though the gate signals G1 to G6 are introduced. Also, when the capacitor 400 of the snubber circuit is discharged and becomes a zero voltage condition, the gate drive circuit 100 may turn on the IGBT 200, implementing the zero voltage switching and reducing the switching loss. Here, the dead time denotes an elapsed time until the change of the output is recognized after the change of the input. That is, when the gate drive circuit 100 operates in dead time mode, the input signal may not affect the output. Accordingly, it can be considered that the input is ignored.

Each terminal of the gate drive circuit 100 may be called a first terminal, a second terminal, and a third terminal according to the connection parts with the switching element. For example, when the switching element is the IGBT 200, a part at which the gate drive circuit 100 is connected to the collector terminal of the IGBT 200 may be called the first terminal, and a part at which the gate drive circuit 100 is connected to the emitter terminal of the IGBT 200 may be called the second terminal. Also, a part at which the gate drive circuit 100 is connected to the gate terminal of the IGBT 200 may be called the third terminal.

The resonant converter according to the exemplary embodiment of the present invention can easily sense the zero voltage condition of the switch using the gate drive circuit, and high efficiency operation can be performed in all load ranges without a separate configuration of a complicated control circuit.

Also, since the high precision output control is possible with a relatively small output filter component, even though an arc occurs at the output terminal, arch energy delivered from the converter to the load can be minimized, efficiently protecting a load vulnerable to the arc. This means that precision control is possible by the resonant converter according to the exemplary embodiment of the present invention without increasing the capacitor value of the output terminal even in case of special power devices such as gyrotron, klystron, magnetron, and radar, which require control precision degree of about 0.1% or less in the source power value.

The capacitor 400 connected in parallel to the diode 300 may serve as a snubber circuit. The snubber circuit may alleviate the rapid change of voltage and may reduce a loss of the turn-on/off.

The resonant converter according to the exemplary embodiment of the present invention may show a high efficiency by converting power only using a single switch leg at the light load in which low power is used and other switch legs together within the rated load range by sensing the voltage of the capacitor of just this snubber circuit. For this, the switch leg of a region A may be designed to be smaller than other switch legs in the value of the capacitor 400 of the snubber circuit.

The reason why the switch leg of the region A is designed to be smaller than other switch legs in the value of the capacitor 400 of the snubber circuit is as follows.

Figure 9:
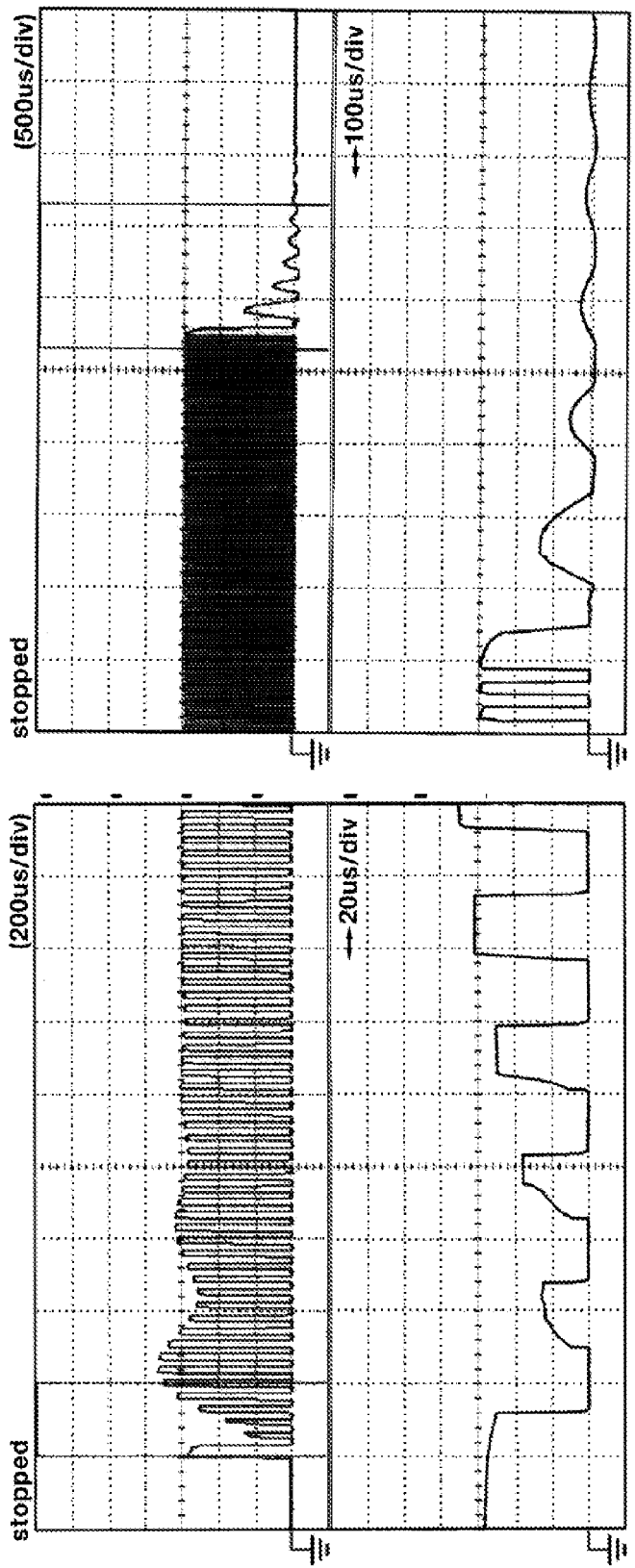
FIG. 9 is a waveform illustrating a drive signal waveform a power semiconductor switching element during an unstable control in a transient state of turning-on/off operation of a controller power device.

As shown in FIG. 9, a light load less than the rated load is applied to the resonant converter, power consumed in the light load may be smaller than that in a medium load or a high load. Accordingly, the resonant converter may output a low power (voltage or current), and for this, the switching frequency applied to the switching element may be adjusted into high.

However, as the switching frequency becomes high, a switching loss of switching elements including the IGBT 200 may rapidly increase. Furthermore, the IGBT 200 may be damaged by burning. Accordingly, there is a difficulty in that a typical resonant converter used in a continuous conduction mode needs to be provided with an addition circuit for controlling the gate driving signal itself to be used in all load ranges (from no load to full load) from no load condition to rated load condition.

Here, the rated load denotes a load that is designed in consideration of the capacity of the resonant converter. That is, when the resonant converter according to the exemplary embodiment of the present invention is designed to drive a magnetron of about 50 KW, the rated load may be 50 KW. Accordingly, when a magnetron with a value smaller than about 50 KW is connected, the value can be referred to as the light load compared to the rated load. Also, when a load is not applied to the output terminal of the resonant circuit, it can be referred to as no load.

When a light load is connected, the resonant converter according to the exemplary embodiment of the present invention intends to ensure the operation of the resonant converter in all voltage and current output ranges by operating only a single switch leg to take charge of the light load.

For this, in the resonant converter according to the exemplary embodiment of the present invention, the capacitor 400 of the snubber circuit of one of a plurality of switch legs may be designed to be smaller than the capacitor 400 of the snubber circuit of other switch legs.

Since the charge capacity becomes smaller when the capacitor 400 is small, the capacitor 400 may be charged and discharged at a faster speed. Accordingly, in the switch leg to take charge of the light load operation, the gate drive circuit 100 may quickly sense the zero voltage of the capacitor 400 of the snubber circuit, thereby performing switching more quickly. That is, even when a high switching frequency signal is used to operate the light load, a switching load can be reduced by an instantaneous response thereto.

On the other hand, the other switch legs of may be designed to be larger than the switch leg taking charge of the light load in the value of the capacitor 400 of the snubber circuit. Accordingly, since the other switch legs are difficult to become the zero voltage in a fast switching frequency, the other switch legs may operate in dead time mode in which the switching is not performed.

Therefore, the operation region can be extended such that operation is possible in all load ranges while reducing the switching loss.

That is, in a related art, although the resonant converter can be designed to operation in all load ranges by sensing a load region of a power device and interrupting a gate signal by a controller, the circuit configuration is complicated, and the reliability is low. Also, in case of low frequency switching, an audible noise may occur.

Accordingly, in the resonant converter according to the exemplary embodiment of the present invention, the above limitation can be overcome by designing the snubber capacitor value of one of a plurality of switch legs to be smaller than the capacitor value of the snubber circuit of the other switch legs.

Also, in the resonant converter according to the exemplary embodiment of the present invention, since the switch leg taking full charge of the light load and the other switch legs together operate during the rated load operation, high precision control of the output voltage can be performed by the operation of these two types of switching leg. Also, since the output voltage is controlled by the high frequency switching operation of only a single switch leg, the ripple of the output voltage can be minimized, and the high precision control can be achieved. Accordingly, due to this high precision control, the optimal design of the output filter can be achieved without increasing the output filter component (output capacitor), and thus, energy delivered to the load upon occurrence of arc can be minimized, efficiently protecting the load.

Figure 2:
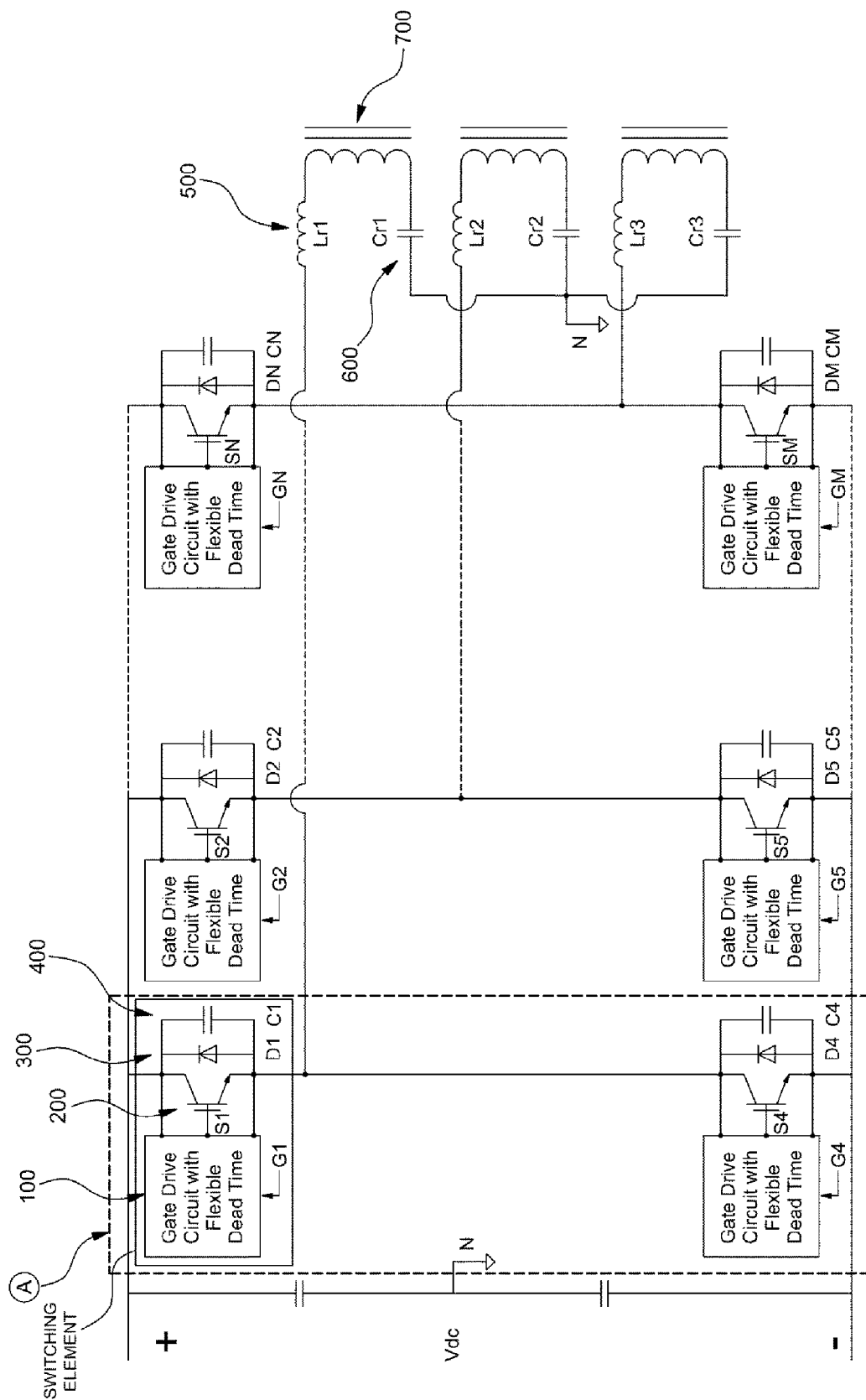
FIG. 2 is a circuit view illustrating a multi-phase resonant converter.

FIG. 2 is a circuit view illustrating a multi-phase resonant converter.

The basic concept of the resonant converter of FIG. 2 is similar to that of the resonant converter of FIG. 1.

The resonant converter of FIG. 1 is designed expecting three-phase, whereas the resonant converter of FIG. 2 is designed expecting multi-phase. However, the resonant converter of FIG. 1 is similar to the resonant converter of FIG. 2 in that one of a plurality of switch legs is designed to take charge of the light load.

The switch leg to take charge of the light load, which is indicated in the block A, may be designed to include a snubber capacitor with a small capacitor so as to be suitable for a fast switching frequency according to a light load condition, and a gate driver circuit may also be designed to have dead time according to the value of this small snubber capacitor.

Accordingly, the resonant converter according to the exemplary embodiment of the present invention may be designed such that one switch leg, i.e., single phase inverter operates in a high frequency switching state taking charge of the light load, and the other two switch legs have a maximum dead time so as to take charge of a rated load condition. Thus, the resonant converter may be configured to include a multi-phase inverter (switch leg) having a certain phase difference. One of the inverters may be designed to operate at a higher switching frequency than the other inverters to implement a hybrid type of multi-phase inverter. Accordingly, the resonant inverter according to the exemplary embodiment of the present invention may also be referred to as a hybrid resonant converter.

Due to this configuration, all inverters may operate with a phase difference at a high load operation region, and thus high precision output control can be achieved. Also, in a light load region, only a separately designed single inverter may operate at a high switching frequency to implement the high precision control, and the other inverter switches do not perform switching operation, enabling the high efficient operation due to no loss.

In the resonant converter according to the exemplary embodiment of the present invention, since all switch legs operate with a phase difference at the rated load region, and only a separate switch leg operates at a high switching frequency in the light load or no load region, high precision control can be achieved while keeping the component of a filter capacitor of an output terminal small.

Therefore, even in case of devices such as gyrotron, klystron, magnetron, and radar power device that need high precision output control, since the high precision control can be achieved without increasing the size of the filter capacitor, the energy of the filter capacitor that is delivered to a load terminal upon occurrence of arc can be minimized while keeping the ripple of the output voltage small.

Figure 3:
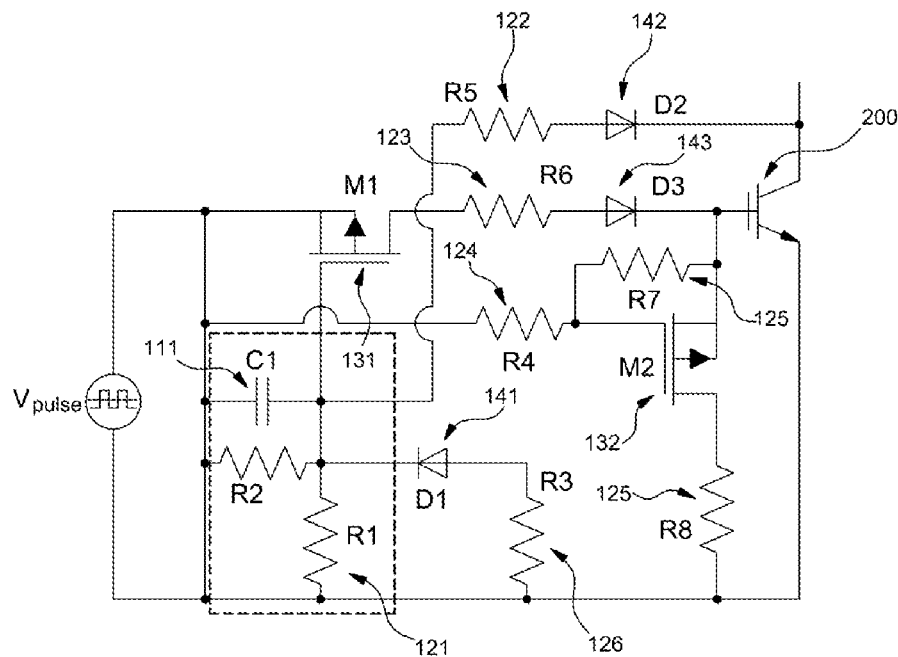
FIG. 3 is a view illustrating an internal circuit of a gate drive circuit.

FIG. 3 is a view illustrating an internal circuit of a gate drive circuit.

In the gate drive circuit 100 according to the exemplary embodiment of the present invention, since the dead time can be flexibly designed, the gate drive circuit 100 can also be referred to as a gate drive circuit with flexible dead time.

The gate drive circuit 100 may be configured to include a resistor, a diode, a capacitor, and a MOSFET element.

In FIG. 3, $V_{pulse}$ denotes a signal applied from the controller to the gate drive circuit 100.

The purpose of the gate drive circuit 100 is to sense from the $V_{pulse}$ whether or not the voltages of both terminals of the switching element become zero and thus apply a gate signal to the switching element.

For this, the gate drive circuit 100 of the resonant converter may set a first capacitor 111 and a first resistor 121 to operate a first MOSFET element 131 with the maximum dead time. The first MOSFET element 131 may apply a gate voltage to the IGBT 200 with a certain dead time when a turn-on signal is applied from the controller. A second MOSFET element 132 may be an element for pulling down the gate voltage when a turn-off signal is applied from the controller. Also, a second diode 142 may be used to sense the voltage of the collector of the IGBT that is used as a switching element.

Hereinafter, a concrete operation method of the gate drive circuit 100 will be described in detail with reference to the accompanying drawings.

Figure 4:
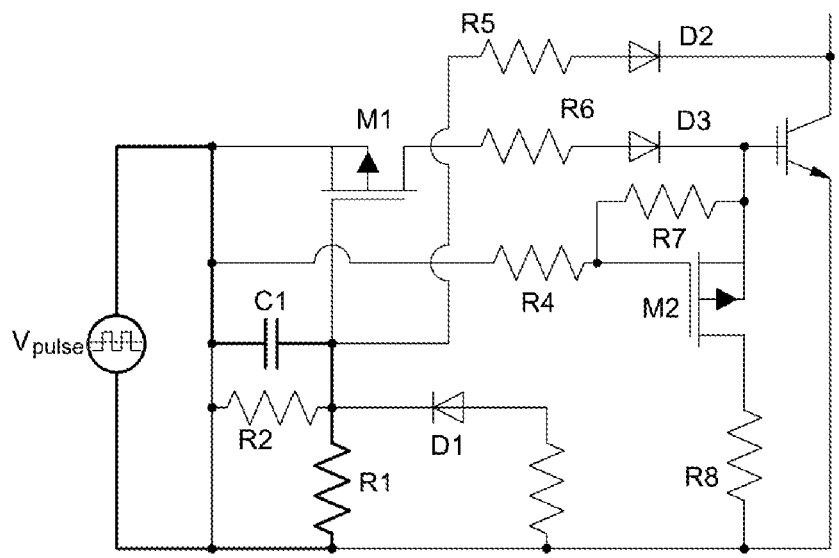
FIG. 4 is a view illustrating an operation of a gate drive circuit upon application of a turn-on signal when voltages at both terminals of a switch element do not correspond to a zero voltage condition.

FIG. 4 is a view illustrating an operation of a gate drive circuit upon application of a turn-on signal when voltages at both terminals of a switch element do not correspond to a zero voltage condition.

When the voltage of the both terminals of the IGBT 200 is not the zero voltage and $V_{pulse}$ that is a gate drive signal is inputted from the controller, the first capacitor 111 may be slowly charged through the first resistor 121. This is because a current flows through the capacitor 111 and the first resistor 121 because a current cannot flow through the second diode 142 because the voltage of the collector of the IGBT 200 is not zero.

Figure 5:
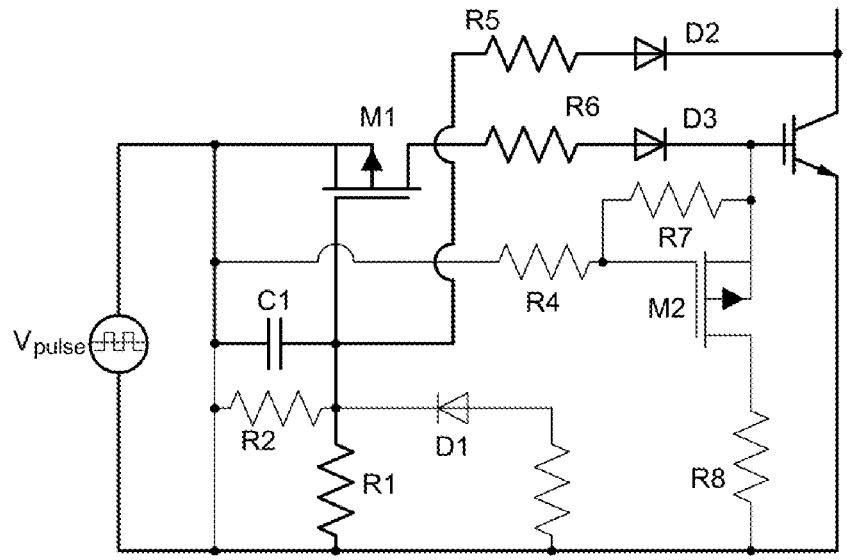
FIG. 5 is a view illustrating a driving operation of a gate drive circuit upon application of a turn-on signal when voltages at both terminals of a switch element correspond to a zero voltage condition.

FIG. 5 is a view illustrating a driving operation of a gate drive circuit upon application of a turn-on signal when voltages at both terminals of a switch element correspond to a zero voltage condition.

When the both terminals of the IGBT 200 become the zero voltage, the second diode 142 may become a forward bias. In this case, since the value of a fifth resistor 122 is designed to be smaller than the value of the first resistor 121, the first capacitor 111 may be rapidly charged through the fifth resistor 122 and the second diode 142.

When the voltage of the first capacitor 111 is charged, the voltages of the both terminals of the capacitor 111 also rise. When the voltages of the both terminals of the first capacitor 111 are charged greater than or equal to a threshold voltage of the gate terminal of the first MOSFET element 131, the first MOSFET element 131 may be turned on.

When the first MOSFET element 131 is turned on, the gate drive signal of the controller may be applied to the gate terminal of the IGBT 200 through a sixth resistor 123 and a third diode 143.

Figure 6:
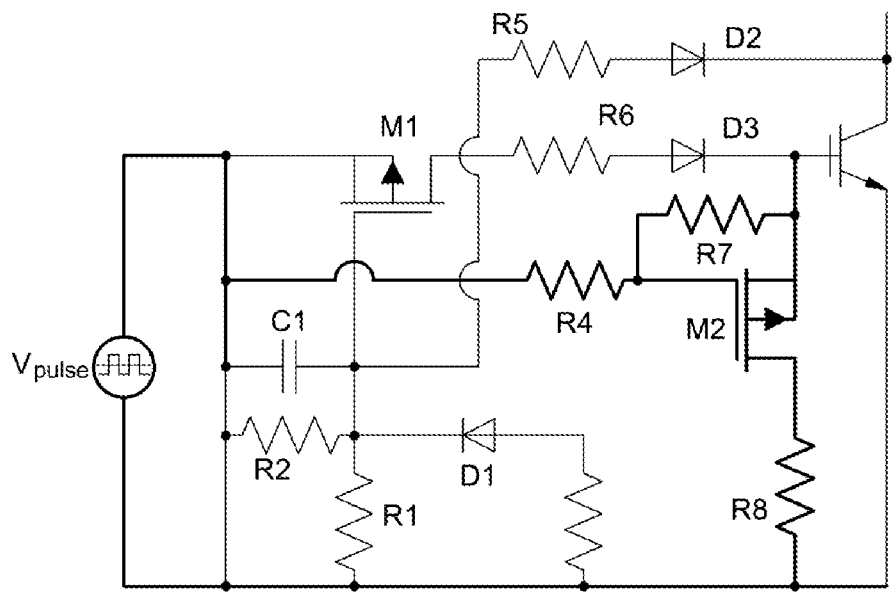
FIG. 6 is a view illustrating an operating state of a gate drive circuit when a turn-off signal is applied from a controller to a gate driver circuit.

FIG. 6 is a view illustrating an operating state of a gate drive circuit when a turn-off signal is applied from a controller to a gate driver circuit.

When a turn-off signal is applied, a voltage may be applied to the gate terminal of the second MOSFET element 132 of the gate drive circuit to turn on the second MOSFET element 132. Accordingly, the current applied to the gate terminal of the IGBT 200 may rapidly flow from the source terminal to the drain terminal of the second MOSFET element 132 and then may be discharged to the ground through an eighth resistor 125.

Similarly, as the turn-off signal is applied from the controller, the voltage charged in the first capacitor 111 may also be discharged through the third resistor 126 and the first diode 141. As the first capacitor 111 is discharged, the first MOSFET element 131 may be turned off, and thus the IGBT 200 may also be switched off.

Since the gate drive circuit of the resonant converter according to the exemplary embodiment of the present invention is provided with a separate MOSFET element to take charge of turn-off of the IGBT 200, the first capacitor 111 may be allowed to be charged from the zero voltage to the threshold voltage at which the first MOSFET element 131 is turned on instead of being charged from a minus (−) voltage to a plus (+) voltage. Accordingly, since the first capacitor 111 need not be charged from a minus (−) voltage to the threshold voltage of the first MOSFET element 131, power applied to the gate drive signal can be saved. Also, since the gate charge and discharge paths are distinguished, MOSFET heating can be reduced during the high frequency switching operation.

As above, the operation state of the gate drive circuit 100 has been described with reference to the drawing.

The values of the first resistor 121 and the first capacitor 111 of the gate drive circuit 100 of the switch leg to take charge of a light load may be designed differently from the values of the gate drive circuit 100 of other switch legs for faster switching.

In other words, the value of the first capacitor 111 of the gate drive circuit 100 of the switch leg to take charge of a light load may be set to a smaller value than the values of other switch legs. Also, the value of the first resistor 121 may be set smaller than the values of the other switch legs. Since the time constant decreases due to the selection of small values of the resistor and the capacitor, the response is possible even for the high frequency switching unlike other switch legs.

Accordingly, in the gate drive circuit 100 of the resonant converter according to the exemplary embodiment of the present invention, the dead time can be flexibly controlled. However, for the selection of such values, it is desirable to select dead time value enough to turn on the first MOSFET element 131.

Figure 7:
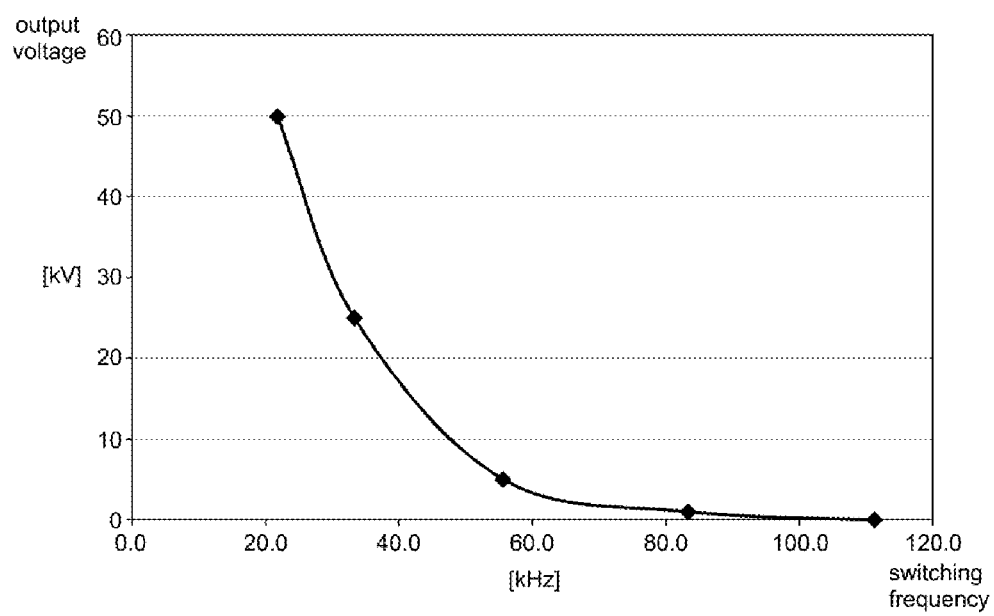
FIG. 7 is a view illustrating a simulation operation result of a resonant converter according to an exemplary embodiment of the present invention.

FIG. 7 is a view illustrating a simulation operation result of a resonant converter according to an exemplary embodiment of the present invention.

Referring to FIG. 7, in the resonant converter according to the exemplary embodiment of the present invention, although the switching frequency is applied at about 60 KHz or more to output low power (voltage or current), the circuit may not be damaged by burning.

Accordingly, it can be seen that it is possible to control a wide load range from a light load to a full load.

Figure 8:
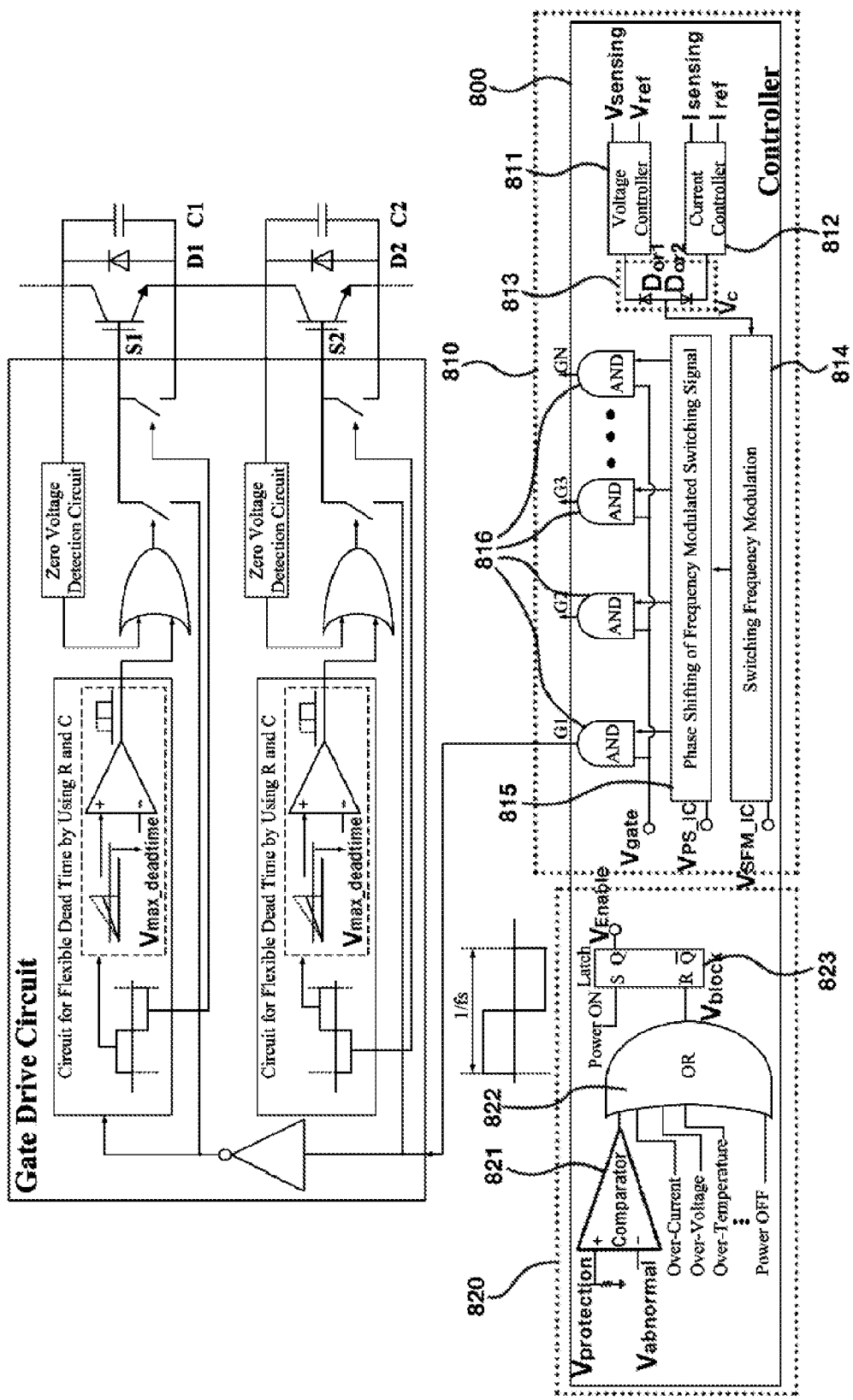
FIG. 8 is a view illustrating a configuration of a controller generating a switching frequency used in a resonant converter according to an exemplary embodiment of the present invention.

FIG. 8 is a view illustrating a configuration of a controller generating a switching frequency used in a resonant converter according to an exemplary embodiment of the present invention.

A controller 800 may generate a switching frequency necessary for each switch leg, and may roughly include a switching frequency generating unit 810 that generates a switching frequency necessary for the operation of first and second switch legs and an operation determining unit 820 that stably controls the turning-on/off of the switching frequency generating unit 810.

The switching frequency generating unit 810 may include a voltage controller 811, a current controller 812, a diode unit 813, a switching frequency modulator 814, a switching frequency phase shifter 815, and an AND gate 816.

The voltage controller 811 and the current controller 812 may be parts that generate control signals by sensing the output voltage and current.

More specifically, the voltage controller 811 may receive a value $V_{sensing}$ obtained by sensing a DC voltage of the output terminal, and may compare the value $V_{sensing}$ with a reference voltage value $V_{ref}$ that the resonant converter intends to output. When the value $V_{sensing}$ is lower than the reference voltage value $V_{ref}$, the voltage controller 811 may output a voltage value proportional to a difference between the two voltage values $V_{sensing}$ and $V_{ref}$ to allow the resonant converter to output the reference voltage value aimed by the resonant converter. Also, the current controller 812 may receive a value $I_{sensing}$ obtained by sensing a DC current of the output terminal, and may compare the value $I_{sensing}$ with a reference current value $I_{ref}$ that the resonant converter intends to output. When the value $I_{sensing}$ is lower than the reference voltage value $I_{ref}$, the current controller 812 may output a current value proportional to a difference between the two current values $I_{sensing}$ and $I_{ref}$ to allow the resonant converter to output the reference current value aimed by the resonant converter.

The diode unit 813 may receive the values of the voltage controller 811 and the current controller 812, and may allow smaller one of the values to be applied to the switching frequency generating unit 810.

For this, the diode unit 813 may be configured such that the anodes of two diodes contact each other. That is, the cathode of one diode $D_{or1}$ may be connected to the output terminal of the voltage controller 811, and the anode thereof may be connected to the anode of the other diode $D_{or2}$. Also, the cathode of the other diode $D_{or2}$ may be connected to the output terminal of the current controller 812, and the switching frequency generating unit 810 may be connected to the anode side at which two diodes contact each other.

Due to this configuration, the diode unit 813 may allow smaller one of the values of the voltage controller 811 and the current controller 812 to be applied to the switching frequency generating unit 810. As a result, when a fine error occurs in either of the two values after reaching the reference voltage value and the reference current value, the fine error may be delivered to the switching frequency generating unit 810 to allow the switching frequency signal applied to the gate drive circuit 100 to be controllable in real-time.

The switching frequency generating unit 810 may be a part that modulates the frequency in proportion to the voltage $V_c$ applied from the diode unit 813. That is, depending on a load connected to the resonant converter, when no load or a light load requiring a low voltage is connected to the load terminal, the switching frequency generating unit 810 may generate a high switching frequency necessary for reducing the voltage value that is outputted. Also, when a rated load or a load that the resonant converter determines as equal to or greater than a light load or no load is connected to the load terminal, the switching frequency generating unit 810 may serve to generate a low switching frequency.

The switching frequency phase shifter 815 may be a part that generates a switching frequency according to the number of the first and second legs. Here, the switching frequency may have a phase difference such that each switch leg can appropriately use the frequency generated by the switching frequency modulator 814. The switching frequency phase shifter 815 may be implemented by a digital circuit such as a Johnson counter.

The switching frequency signal generated in the switching frequency phase shifter 815 may be inputted into one terminal of the AND gates 816 to take charge of each switch leg. The AND gates 816 may take charge of one switch leg, respectively.

Each gate signal that is modulated in frequency and phase by passing the switching frequency modulator 814 and the switching frequency phase shifter 815 may be inputted into each gate drive circuit to be used to drive one switch leg.

The controller 800 and the operation determining unit 820 may be configured to include a comparator 821 including an operational amplifier, an OR gate 822, and an SR latch 823.

The comparator 821 of the operation determining unit 820 may compare a set value determined as abnormal with a value sensed from the output terminal. When the sensed value is larger than the set value, the comparator 821 may generate a positive output to input the positive output into the OR gate 822. The positive output value may also be referred to as a high output signal.

More specifically, the comparator 821 of FIG. 8 may receive a predetermined voltage value $V_{abnormal}$ assumable as an abnormal output value at the output terminal and a sensed value $V_{protection}$ received from the output terminal, and when the sensed value $V_{protection}$ is applied as a value larger than the predetermined voltage value $V_{abnormal}$ considered as abnormal, the comparator 821 may generate a positive output and input the positive output into the OR gate 822.

The OR gate 822 may receive abnormal signals such as temperature and current of the output terminal that are inputted from the comparator 821 or directly inputted, and when an abnormality occurs in any one of the abnormal signals, may send an output to an R terminal of the SR latch 823.

The signals inputted into the OR gate 822 may include abnormal voltage, current, and temperature, or a power off signal. These signals may be directly applied to the OR gate 822, and may also be inputted into the OR gate 822 after undergoing a process of being compared with a predetermined value by the comparator 821. These abnormal signals inputted into the OR gate 822 may also be referred to as a protection circuit-related signal.

The SR latch 823 may be a part that determines the operation of the whole switching frequency generating unit 810 using a power signal and the signal inputted from OR gate 822.

For this, the SR latch 823 may receive the power signal (Power On) for driving the controller 800 through an S terminal, and may receive the abnormal signals outputted from the OR gate 822 through an R terminal.

A Q terminal Venable that is a non-inverting output of the SR latch 823 may be inputted into an operation terminal $V_{sfm\_ic}$ of the switching frequency modulator 814 of the switching frequency generating unit 810, an operation terminal $V_{ps\_ic}$ of the switching frequency phase shifter 815, and the other input terminal $V_{gate}$ of the AND gate 816. When a high value is inputted into these terminals, each part may normal operate. On the other hand, when a low value is inputted, each part may stop operating.

The truth table of the SR latch 823 is as follows.

TABLE 1

| Functional Table | | | | |
|---|---|---|---|---|
| S | R | Q | Q' | |
| 1 | 0 | 1 | 0 | Set State |
| 0 | 0 | 1 | 0 | |
| 0 | 1 | 0 | 1 | Reset State |
| 0 | 0 | 0 | 1 | |
| 1 | 1 | 0 | 0 | Undefined |

Accordingly, in the SR latch 823 of the operation determining unit 820 of the controller 800 of the resonant converter, when power is applied and there is no abnormality on the output terminal, the SR latch 823 may allow the switching frequency normally generated by the switching frequency generating unit 810 to be applied to the gate drive circuit 100.

However, when there is an abnormality such as voltage, current, or rapid temperature rise on the output terminal, these value may be inputted into the R terminal of the SR latch 823 through the OR gate 822. Accordingly, the output value of the Q terminal of the SR latch 823 may become low (0), and thus, the operation of the switching frequency generating unit 810 may stop.

Accordingly, the resonant converter can be prevented from being damaged by the abnormality of the output terminal.

In a related art, since the output of the switching frequency modulator 814 implemented using analog elements such as resistors and capacitors is directly inputted into the gate drive circuit 100, a transient abnormal waveform can be formed upon turning-on/off of the power supply, thereby damaging the IGBT 200. However, in the exemplary embodiment of the present invention, since the signal Venable that operates the switching frequency modulator 814, the switching frequency phase shifter 815, and the AND gate 816 is applied through a circuit designed based on digital elements such as a latch, a switching frequency can be stably generated without an abnormality of a transient state even upon turning-on/off of the power supply.

FIG. 9 is a waveform illustrating a drive signal waveform a power semiconductor switching element during an unstable control in a transient state of turning-on/off operation of a controller power device.

It can be seen that the drive signal waveform of the power semiconductor switching element is unstably supplied in the transient state of turning on/off.

Figure 10:
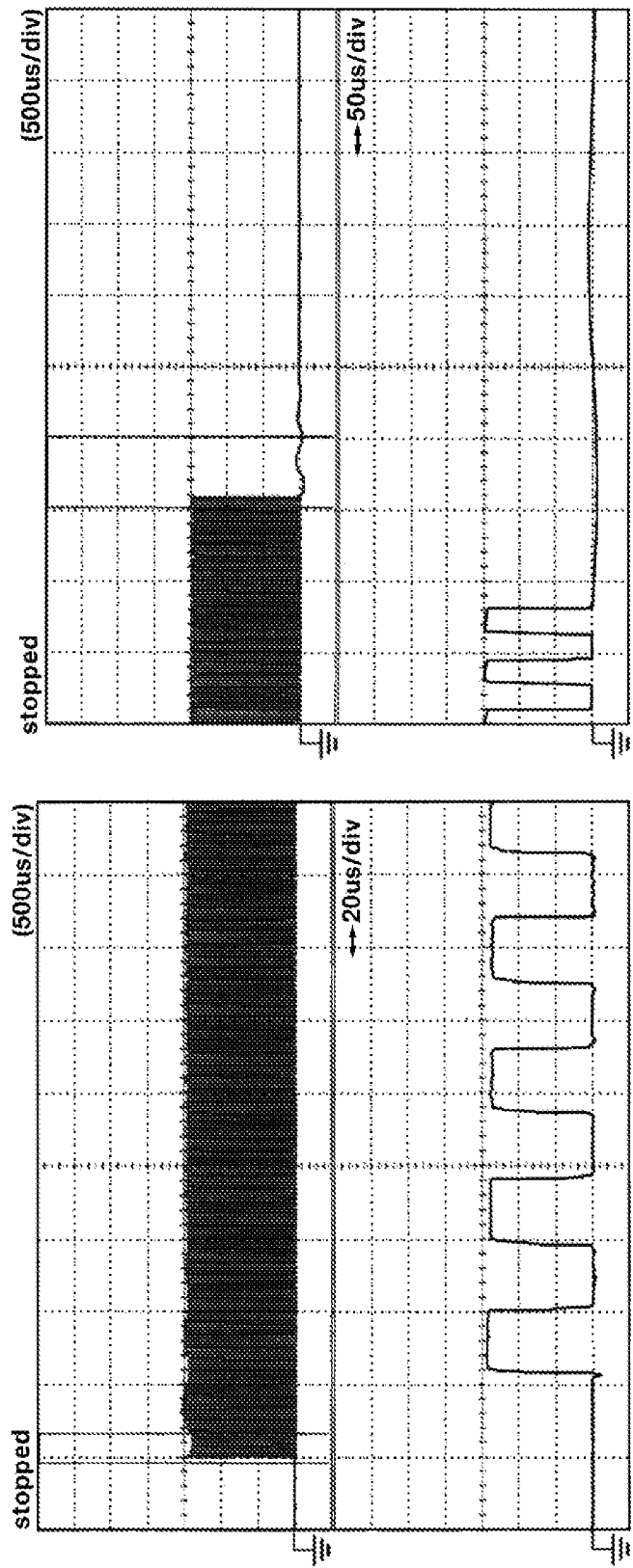
FIG. 10 is a waveform illustrating a drive signal waveform of a power semiconductor switching element after a stable control in a transient state of turning-on/off operation of a controller power device.
Figure 11:
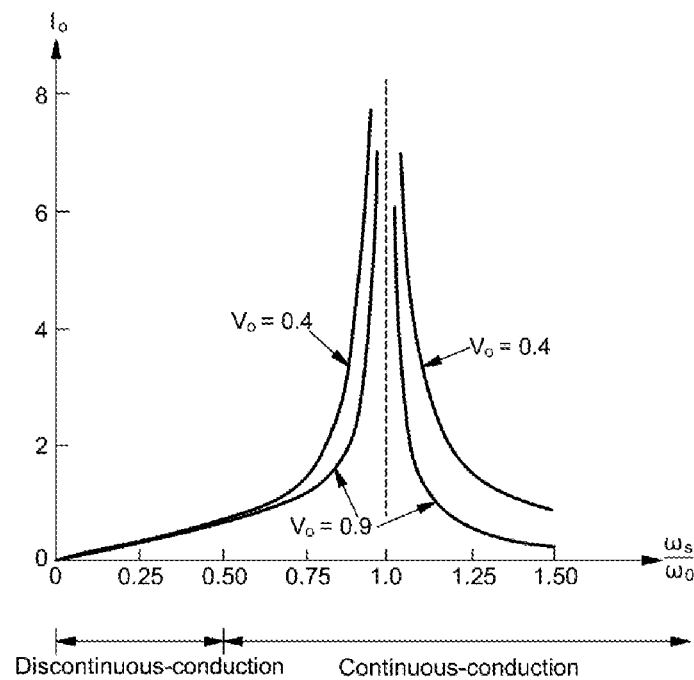
FIG. 11 is a view illustrating control characteristics of a resonant converter according to a switching frequency, which shows the resonant converter operating in a continuous conduction region has to increase the switching frequency to lower an output voltage.
Figure 12:
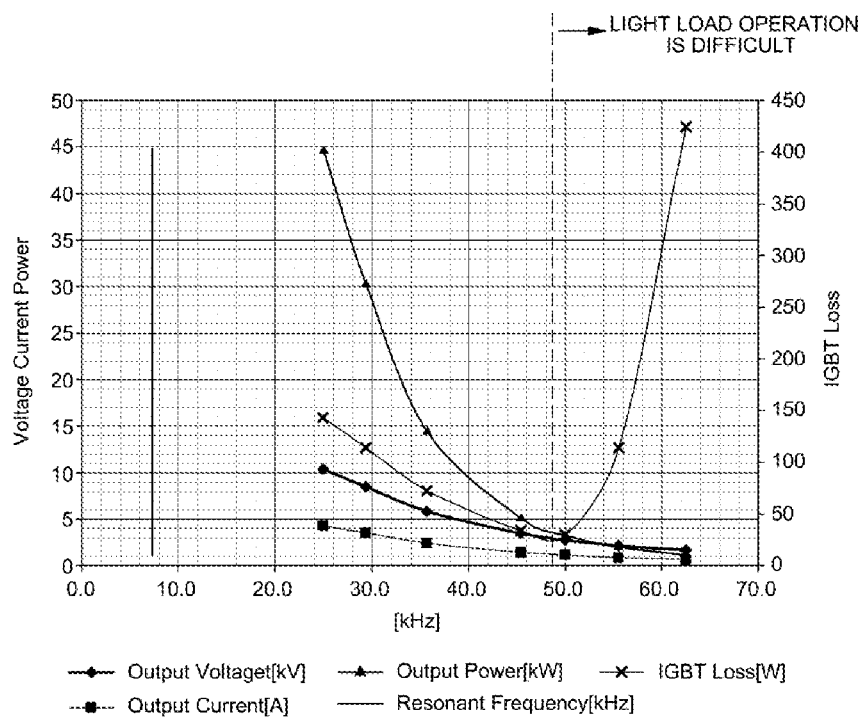
FIG. 12 is a view illustrating a loss of an Insulated Gate Bipolar Transistor (IGBT) when an output power (voltage and current) is lowered for the use at a light load region.

FIG. 10 is a waveform illustrating a drive signal waveform of a power semiconductor switching element after a stable control in a transient state of turning-on/off operation of a controller power device.

Compared with FIG. 9, it can be seen that stable control is enabled even in the transient state of turning on/off.

A special power source used in an electron accelerator or a radar requires high precision output control of high voltage DC power. These apparatuses require control precision degree of about 0.1% or less. Recently, domestic and foreign enterprises are developing and using a separate power source that can generate the maximum output and perform precision control, but cost for manufacturing these power supplies is expensive. Also, since a series or parallel operation of two power supplies is needed, it is complicate to control, and it is difficult to secure reliability. Also, since the control is complicated, it is difficult to secure reliability upon occurrence of arc.

Accordingly, in case of a typical high voltage power source, a method of limiting an operable minimum output voltage range is used to achieve a high efficiency at a rated load.

However, a resonant converter according to an exemplary embodiment of the present invention, which can be called a hybrid-type inverter, can implement a high precision control power supply with a single converter, and can achieve a high efficiency at a rating. Furthermore, the resonant converter is not limited in output voltage control range.

Accordingly, the resonant converter can be efficiently applied as a DC source of a radar power supply and an electron accelerator power supply which require high precision and high voltage output control. Also, the resonant converter can be applied to the power application field that needs to minimize the voltage droop and the ripple of the output voltage like gyrotron, klystron, and magnetron and limit energy delivered to the load terminal upon occurrence of arc. Besides, the resonant converter can be variously utilized in battery charges, high voltage capacitor chargers, and general-purpose DC power supplies.

As described above, a high efficiency resonant converter with an extensive load range according to an embodiment of the present invention has the following effects.

First, the DC/DC converter can an extensive load range by including a single switch leg that takes full charge of a light load operation. Accordingly, the DC/DC converter can be applied to various industrial power supplies such as battery chargers, capacitor chargers, and plasma application power supplies, and general-purpose DC power supplies, which need to operate in all load ranges (from no load to full load).

Second, since only the signal switch leg operates and other switch legs do not operate during the light load operation by a high switching frequency, a switching loss does not occur in the other switch legs, thereby maintaining a high input vs. output efficiency.

Third, since the switch leg taking charge of the light load and the other switch legs together operate at a rated load, a high efficiency can be maintained.

Fourth, since the capacitor value of the switch leg taking charge of the light load and the capacitor and resistor values of a gate drive circuit are adjusted, the control range of the switching frequency can be widely extended in spite of soft switching.

Fifth, since the dead time of the gate drive circuit of each switch leg can be freely designed and modified, a converter adaptable to various applications can be designed.

Sixth, since the dead time of the gate drive circuit for each switch leg can be set to the maximum dead time, and the time constant is adjusted according to the switching frequency, the zero voltage condition of a switching element can be efficiently sensed.

Seventh, in the gate drive circuit according to an exemplary embodiment of the present invention, since a separate MOSFET element that can quickly turn off the switching element is provided, a parasitic capacitor of the power semiconductor switching elements is charged from the zero voltage, not a minus (−) voltage. Accordingly, the power consumption for the gate driving power can be reduced, and since the gate charge and discharge paths are distinguished, MOSFET heating can be reduced during the high frequency switching operation.

Eighth, a high efficiency can be maintained at a rating by improving the waveform of a resonant current.

Ninth, the gate drive circuit according to an embodiment of the present invention can reduce a switching loss by easily sensing the zero voltage condition of a switch. Accordingly, the gate drive circuit can be applied to various power supplies such as a converter and an inverter.

Tenth, since all switch legs operate at the rated load region, and only a separate switch leg operates at a switching frequency of a high frequency in the light load region, high precision control can be achieved while keeping the component of a filter capacitor of an output terminal small. Therefore, even in case of devices such as gyrotron, klystron, magnetron, and radar power device that need high precision output control, since the high precision control can be achieved without increasing the size of the filter capacitor, the energy of the filter capacitor that is delivered to a load terminal upon occurrence of arc can be minimized while keeping the ripple of the output voltage small.

Eleventh, in a controller of a resonant converter according to an exemplary embodiment of the present invention, since a switching frequency can be stably generated even upon turning-on/off of a power supply a power semiconductor switch device such as an Insulated Gate Bipolar Transistor (IGBT) can be prevented from being damaged by burning.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A resonant converter for converting a direct current (DC) into another DC with a desired level, comprising:
    a first switch leg having one end connected to a positive terminal of a DC power source and the other end connected to a negative terminal of the DC power source to independently operate at a switching frequency used in an application of an output voltage for no load or a light load equal to or less than a rated load and operate so as to reduce a ripple of the output voltage at a frequency equal to or less than the switching frequency used in the application of the output voltage for no load or the light load equal to or less than the rated load; and
    one or more second switch legs having one end connected to the positive terminal of the DC power source and the other end connected to the negative terminal of the DC power source to operate at a switching frequency for the rated load or a frequency equal to or less than the switching frequency used in the application of the output voltage for no load or the light load that the first switch leg takes charge of.

2. The resonant converter of claim 1, wherein the first and second switch legs comprise two switching units connected in series, and
the switching unit comprises:
a power semiconductor switching element;
a diode comprising a cathode connected to a current inflow terminal of the power semiconductor switching element and an anode connected to a current outflow terminal of the power semiconductor switching element;
a snubber capacitor connected in parallel to the diode; and
a gate drive circuit applying a switching signal to a terminal for turning-on/off control of the power semiconductor switching element.

3. The resonant converter of claim 2, wherein the power semiconductor switching element is selected from an insulated gate bipolar transistor, a MOSFET, and a bipolar junction transistor.

4. The resonant converter of claim 2, wherein a value of a capacitor of a snubber circuit for preventing a rapid voltage increase of the first switch leg is designed to be smaller than a value of a capacitor of a snubber circuit of the second switch leg such that zero voltage sensing of the gate drive circuit of the first switch leg is faster than zero voltage sensing of the gate drive circuit of the second switch leg.

5. The resonant converter of claim 2, wherein:
the gate drive circuit is configured to comprise a first power semiconductor switching element, a second power semiconductor switching element, first to third diodes, and first to eighth resistors, and a capacitor;
to distinguish a charge path and a discharge path of a current applied to the terminal for the turning-on/off control of the power semiconductor switching element of the switching unit,
a gate drive signal is inputted into the current outflow terminal of the first power semiconductor switching element, and one end of the sixth resistor is connected to the current outflow terminal of the first power semiconductor switching element;
the current outflow terminal of the first power semiconductor switching element is connected to one end of the capacitor, one end of the fourth resistor, one end of the second resistor, and the current outflow terminal of the power semiconductor switch element of the switching unit;
the other end of the capacitor is connected to one end of the first resistor, one end of the fifth resistor, a cathode of the first diode, and a terminal for turning-on/off control of the first power semiconductor switching element;
the other end of the first resistor is connected to one end of the second resistor;
an anode of the first diode is connected to one end of the third resistor;
the other end of the third resistor is connected to the other end of the first resistor;
the other end of the fifth resistor is connected to an anode of the second diode, and a cathode of the second diode is connected to the current inflow terminal of the power semiconductor switching element of the switching unit;
the other end of the sixth resistor is connected to an anode of the third diode;
a cathode of the third diode is connected to the terminal for the turning-on/off control of the power semiconductor switching element of the switching unit, one end of the seventh resistor, and a current outflow terminal of the second power semiconductor switching element;
the other end of the seventh resistor is connected to the other end of the fourth resistor and a terminal for turning-on/off control of the second power semiconductor switching element; and
the current outflow terminal of the second power semiconductor switching element is connected to one end of the eighth resistor, and the other end of the eighth resistor is connected to the current outflow terminal of the second power semiconductor switching element.

6. The resonant converter of claim 5, wherein the power semiconductor switching element is selected from an insulated gate bipolar transistor, a MOSFET, and a bipolar junction transistor.

7. The resonant converter of claim 5, wherein a value of a first capacitor of the gate drive circuit and a value of the first resistor is controlled to adjust a dead time of the gate drive circuit.

8. The resonant converter of claim 5, wherein a value of a first capacitor of the gate drive circuit of the first switch leg is designed to be smaller than a value of a first capacitor of the gate drive circuit of the second switch leg, and a value of a first resistor of the gate drive circuit of the first switch leg is designed to be smaller than a value of a first resistor of the gate drive circuit of the second switch leg, such that an operation frequency range of the power semiconductor switching element of the gate drive circuit of the first switch leg is wider than an operation frequency range of the power semiconductor switching element of the gate drive circuit of the second switch leg.

9. The resonant converter of claim 2, further comprising a controller that applies a gate drive signal to the gate drive circuit.

10. The resonant converter of claim 9, wherein the controller comprises:
a switching frequency generating unit generating a switching frequency necessary for an operation of the first and second switch legs; and
an operation determining unit stably controlling turning-on/off of the switching frequency generating unit.

11. The resonant converter of claim 10, wherein:
the switching frequency generating unit is configured to comprise a voltage controller, a current controller, a switching frequency modulator, a diode unit determining a voltage applied to the switching frequency modulator, a switching frequency phase shifter, and an AND gate;
the voltage controller compares a sensed output DC voltage value with a targeted reference voltage value, and when the sensed value is smaller than the reference voltage value, outputs a voltage proportional to a different between the sensed value and the reference voltage value;
the current controller compares a sensed output DC current value with a targeted reference current value, and when the sensed value is smaller than the reference current value, outputs a voltage proportional to a different between the sensed value and the reference current value;
the diode unit compares output voltage values from the voltage controller and the current controller, and applies smaller one of the output voltages to the switching frequency modulator;
the switching frequency modulator outputs a switching frequency in proportion to a magnitude of a signal applied from the voltage controller or the current controller through the diode unit;

the switching frequency phase shifter receives the switching frequency from the switching frequency modulator to generate a frequency phase-shifted from the switching frequency according to a number of the first and second switch legs; and the AND gate is provided in plurality according to the number of the first and second switch legs and receives the frequency from the switching frequency phase shifter through one terminal by each AND gate to take charge of each switch leg.

12. The resonant converter of claim 10, wherein:

the operation determining unit comprises an SR latch, a comparator, and an OR gate;

the comparator compares a value sensed from an output terminal with a predetermined reference value, and when the sensed value is greater than the predetermined reference value, outputs a high output signal;

the OR gate receives a protection circuit-related signal comprising a value outputted from the comparator and outputs the protection circuit-related signal to an R terminal of the SR latch for turning off control of a power supply; and the SR latch determines an output of a Q terminal using the signal inputted into the R terminal and a power application signal applied to an S terminal and input the output of the Q terminal into the switching frequency generating unit.

13. A gate drive circuit is configured to comprise a first power semiconductor switching element, a second power semiconductor switching element, first to third diodes, and first to eighth resistors, and a capacitor;

to distinguish a charge path and a discharge path of a current applied to the terminal for the turning-on/off control of the power semiconductor switching element of the switching unit, a gate drive signal is inputted into the current outflow terminal of the first power semiconductor switching element, and one end of the sixth resistor is connected to the current outflow terminal of the first power semiconductor switching element;

the current outflow terminal of the first power semiconductor switching element is connected to one end of the capacitor, one end of the fourth resistor, one end of the second resistor, and the current outflow terminal of the power semiconductor switch element of the switching unit;

the other end of the capacitor is connected to one end of the first resistor, one end of the fifth resistor, a cathode of the first diode, and a terminal for turning-on/off control of the first power semiconductor switching element;

the other end of the first resistor is connected to one end of the second resistor;

an anode of the first diode is connected to one end of the third resistor;

the other end of the third resistor is connected to the other end of the first resistor;

the other end of the fifth resistor is connected to an anode of the second diode, and a cathode of the second diode is connected to the current inflow terminal of the power semiconductor switching element of the switching unit;

the other end of the sixth resistor is connected to an anode of the third diode;

a cathode of the third diode is connected to the terminal for the turning-on/off control of the power semiconductor switching element of the switching unit, one end of the seventh resistor, and a current outflow terminal of the second power semiconductor switching element;

the other end of the seventh resistor is connected to the other end of the fourth resistor and a terminal for turning-on/off control of the second power semiconductor switching element; and the current outflow terminal of the second power semiconductor switching element is connected to one end of the eighth resistor, and the other end of the eighth resistor is connected to the current outflow terminal of the second power semiconductor switching element.

* * * * *